US012623435B2

(12) United States Patent
Liu et al.

(10) Patent No.: US 12,623,435 B2
(45) Date of Patent: May 12, 2026

(54) TUBULAR POCKET FABRIC FOR PREVENTING DEPOSITION OF DOWN

(71) Applicant: Formosa Taffeta Co., Ltd., Touliu (TW)

(72) Inventors: Fang-Jong Liu, Touliu (TW); Ling Li Lin, Touliu (TW); Chia-Hao Lin, Touliu (TW)

(73) Assignee: Formosa Taffeta Co., Ltd., Touliu (TW)

( * ) Notice: Subject to any disclaimer, the term of this patent is extended or adjusted under 35 U.S.C. 154(b) by 0 days.

(21) Appl. No.: 17/894,387

(22) Filed: Aug. 24, 2022

(65) Prior Publication Data

US 2023/0066203 A1      Mar. 2, 2023

(51) Int. Cl.
*B32B 7/05* (2019.01)
*B32B 5/02* (2006.01)
*B32B 5/26* (2006.01)

(52) U.S. Cl.
CPC ................ *B32B 7/05* (2019.01); *B32B 5/024* (2013.01); *B32B 5/263* (2021.05); *B32B 2250/02* (2013.01); *B32B 2250/20* (2013.01); *B32B 2262/0276* (2013.01);
(Continued)

(58) Field of Classification Search
None
See application file for complete search history.

(56) References Cited

U.S. PATENT DOCUMENTS

| | | | | |
|---|---|---|---|---|
| 3,811,239 A | * | 5/1974 | Becker | ................... B32B 27/08 52/406.1 |
| 2011/0094004 A1 | * | 4/2011 | Li | ........................... A47G 9/086 112/475.08 |

(Continued)

FOREIGN PATENT DOCUMENTS

| | | |
|---|---|---|
| CN | 104116195 A | 10/2014 |
| CN | 204764885 U | 11/2015 |
| CN | 107458033 A | 12/2017 |

(Continued)

OTHER PUBLICATIONS

English machine translation of the description of KR-20210063626-A, obtained from ESPACENET (Year: 2021).*

(Continued)

*Primary Examiner* — Thomas J Kessler
(74) *Attorney, Agent, or Firm* — Rimon PC

(57) ABSTRACT
The present invention provides a pocket fabric, including at least one tubular pocket, where each tubular pocket includes: a tubular sidewall formed between two ends of the tubular pocket; at least two filling chambers formed between the two ends and surrounded by the tubular sidewall; and at least one mesh barrier layer provided between two filling chambers and substantially perpendicular to the tubular sidewall, wherein the filling chambers are communicated with each other. The mesh barrier layer allows fluffy filler to be maintained in the filling chamber and substantially prevents it from moving to adjacent filling chambers, so that the filler cannot accumulate in one place due to gravity or other external forces. Therefore, the pocket fabric of the present invention can maintain the desired warmth retention property after a period of use with filler evenly distributed inside.

18 Claims, 18 Drawing Sheets

(52) U.S. Cl.
CPC ... *B32B 2307/304* (2013.01); *B32B 2307/732*
(2013.01); *B32B 2437/00* (2013.01); *B32B*
*2601/00* (2013.01)

(56) References Cited

U.S. PATENT DOCUMENTS

| | | | | |
|---|---|---|---|---|
| 2018/0116317 A1* | 5/2018 | Inoue | .................... | A41D 31/02 |
| 2020/0196689 A1* | 6/2020 | Clarke | ................. | A41D 31/065 |

FOREIGN PATENT DOCUMENTS

| | | |
|---|---|---|
| CN | 207626957 U | 7/2018 |
| CN | 109875155 A | 6/2019 |
| CN | 111118694 A | 5/2020 |
| CN | 215856584 U | 2/2022 |
| JP | 2006122379 A | 5/2006 |
| JP | 3205779 U | 8/2016 |
| KR | 20210063626 A * | 6/2021 |
| TW | 200827504 A | 7/2008 |
| TW | M433826 U1 | 7/2012 |
| TW | I583838 B | 5/2017 |
| TW | M624300 U1 | 3/2022 |

OTHER PUBLICATIONS

Office Action issued in related Chinese Patent Application No.
202110982555.0, dated May 24, 2025, 4 pages.
Translation of Search Report issued in related Chinese Patent
Application No. 202110982555.0, dated May 23, 2025.

* cited by examiner

90

93

91

92

TUBULAR POCKET FABRIC FOR PREVENTING DEPOSITION OF DOWN

PRIORITY CLAIM AND CROSS-REFERENCE

This application claims priority to Taiwan Application No. 110131513 filed on 25 Aug. 2021, which is incorporated herein by reference.

FIELD OF THE INVENTION

The present invention relates to a pocket fabric, and in particular, to a pocket fabric that can allow for uniform fill distribution and maintain the desired warmth after a period of use.

BACKGROUND

Common methods to confer warmth retention to clothes may include using a double-layered fabric to form many filling areas between the layers for fillers such as down, cotton cloth, artificial resin cotton and the like, and filling between the two layers of fabric with a fluffy filler to make the filing area become a three-dimensional space, so that the air in the three-dimensional space contributes to the warmth retention property of clothes. For example, Taiwan Patent No. I583838B discloses a pocket fabric including a plurality of tubular pockets interwoven with a plurality of warp yarns and a plurality of weft yarns. The plurality of tubular pockets can be used for filling.

As shown in FIG. 1 (i.e., FIG. 3 in Taiwan Patent No. I583838B), the pocket fabric 90 includes tubular pockets 91 vertically arranged. Filler can be filled into the inner space of each tubular pocket 91 from an upper opening 92 or a lower opening 93 of the tubular pocket 91. When users wear the pocket fabric 90, a plurality of tubular pockets 91 are arranged substantially parallel to the ground. However, after a period of use of the pocket fabric 90, the filler in the inner space of the tubular pocket 91 would accumulate at the lower opening 93 due to gravity. As shown in FIG. 2, only sparse filler 95 is retained in the area near the upper opening 92 of the pocket fabric 90, but the filler 95 present in the area near the lower opening 93 becomes denser. As a result, the warmth retention is gradually increased at the lower portion of the pocket fabric 90, but is gradually reduced at the upper portion, so the warmth retention of the fabric 90 is uneven, causing discomfort to on the wearer. In addition, no matter whether the tubular pockets are arranged vertically or horizontally, after the pocket fabric is washed several times, the filler may also accumulate in one place, causing discomfort to the wearer due to uneven warmth retention of the fabric.

To prevent motion of the filler in the pocket fabric in the long tubular pockets causing an uneven distribution of the filler and affecting the warmth retention effect of the fabric, in some pocket fabrics, the long tubular pockets are filled with filler in a fixed shape, and the filler just fills up the inner space of the long tubular pockets, so that the filler cannot move in the long tubular pockets, referring to Taiwan Patent TW M433826; or some pocket fabrics include lattice pockets instead of long tubular pockets, referring to Japan Patent JP 3205779 U, with a small inner space for each lattice pocket, thereby reducing the uneven distribution of filler.

However, if the pocket fabric is filled with filler in a fixed shape, additional processing and manufacturing costs are required for the filler. Lattice pockets require more pockets by volume than long pockets. Therefore, a complex manufacturing process is required and more seams need to be formed for the lattice pocket fabric, which cannot be filled with down, resulting in cold spots; and body heat will also dissipate through the seams, thereby reducing the effect of warmth retention.

SUMMARY OF THE INVENTION

An objective of the present invention is to provide a pocket fabric that can maintain the desired warmth retention property after a period of use with filler evenly distributed.

The present invention provides a pocket fabric, including at least one tubular pocket, where each tubular pocket includes:

a tubular sidewall formed between two ends of the tubular pocket;

at least two filling chambers formed between the two ends and surrounded by the tubular sidewall; and at least one mesh barrier layer provided between two filling chambers and substantially perpendicular to the tubular sidewall, wherein the filling chambers are communicated with each other.

In the present invention, each mesh barrier layer includes a plurality of yarn segments connected to a plurality of points on an inner side of the tubular sidewall.

In the present invention, the yarn segments used to form the mesh barrier layer are elastic or non-elastic yarns.

In the present invention, the distance between an end and a mesh barrier layer near the end is about 2 cm to about 20 cm.

In the present invention, when a tubular pocket of the pocket fabric includes a plurality of mesh barrier layers, the distance between two adjacent mesh barrier layers is about 2 cm to about 20 cm.

In the present invention, the pocket fabric includes a plurality of tubular pockets arranged in a direction perpendicular to a tubular sidewall of the tubular pockets, where the tubular sidewall of each tubular pocket includes vents to be in communication with adjacent tubular pockets.

In the present invention, the mesh barrier layer provided in each tubular pocket allows fluffy filler to be maintained in the filling chamber and substantially prevents it from moving to adjacent filling chambers, so that the filler cannot accumulate in one place due to the influence of gravity or other external forces. In addition, the mesh barrier layer is only formed by connecting a few "points" on the tubular sidewall of the tubular pocket, so that the pocket can be maintained in a tubular shape; and filler can also be present in the mesh barrier layer, so that no seams would be formed to create cold spots. Moreover, the tubular pocket of the pocket fabric in the present invention can be integrally formed with the mesh barrier layer without increasing the complexity of the manufacturing process.

DETAILED DESCRIPTION OF THE DISCLOSURE

Figure 1:
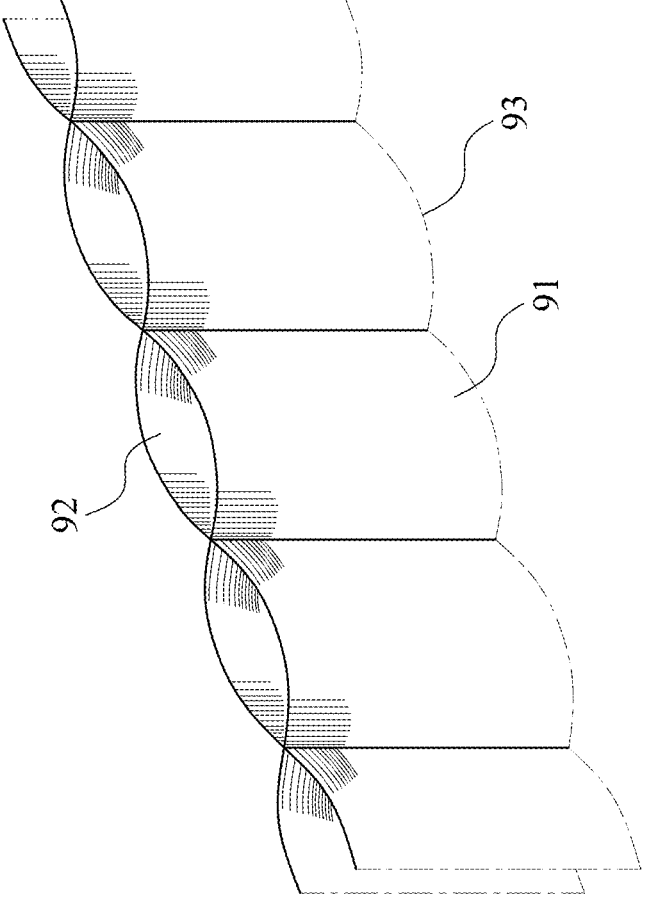
FIG. 1 is a perspective view of a conventional pocket fabric.
Figure 1:
Figure 2:
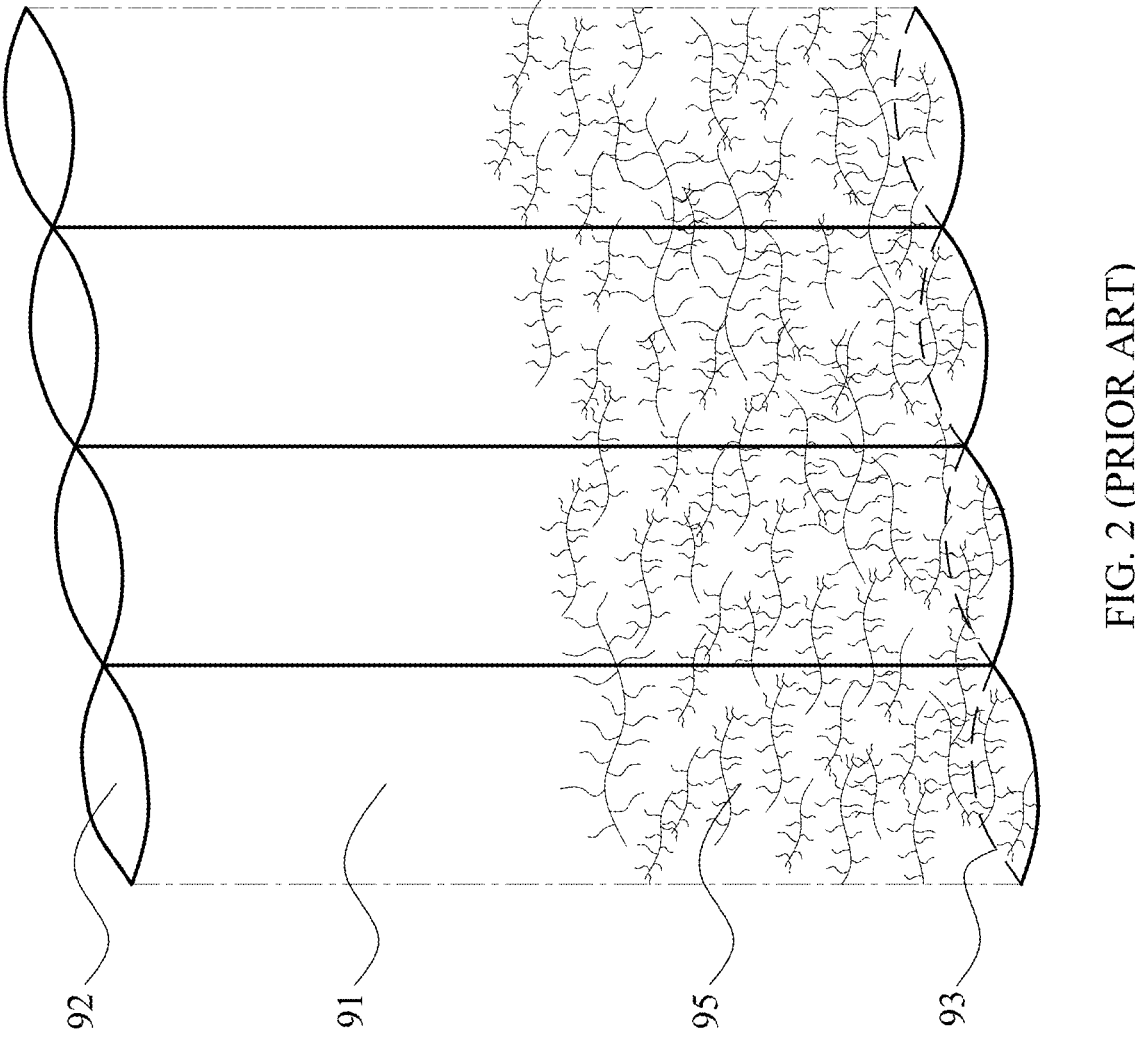
FIG. 2 is a perspective side view of a conventional pocket fabric after a period of use.
Figure 2:
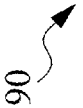

The present invention may be better understood with reference to this detailed description and the examples included herein. Numerous specific details are set forth in order to provide a thorough understanding of the examples described herein. However, a person of ordinary skill in the art will understand that the examples described herein may be practiced without these specific details. Furthermore, the descriptions herein do not impart any limitation to the scope of the present invention.

In this text (especially in the claims), the use of "a," "the" and similar terms should be understood to include both the singular and plural forms unless the context dictates otherwise. In addition, for the sake of clarity, the size of each element and region may be exaggerated in the drawings and not drawn according to the actual scale.

It should be understood that any numerical range quoted in this specification is intended to include all sub-ranges contained therein. For example, a range from "1 to 10" includes all sub-ranges between the stated minimum value of 1 and the stated maximum value of 10 (such as from 2 to 8, 3 to 6, or 4 to 9) and includes the two values, that is, a range including a minimum value greater than or equal to 1 and a maximum value less than or equal to 10. Because the range of values disclosed is continuous, the range includes every value between the minimum value and the maximum value. Unless otherwise specified, various numerical ranges indicated in this specification are approximate values.

In this context, the term "about" is used to indicate that a value measured by persons skilled in the art includes acceptable variation of error which is determined to a certain extent by how the measurement is carried out.

Figure 3:
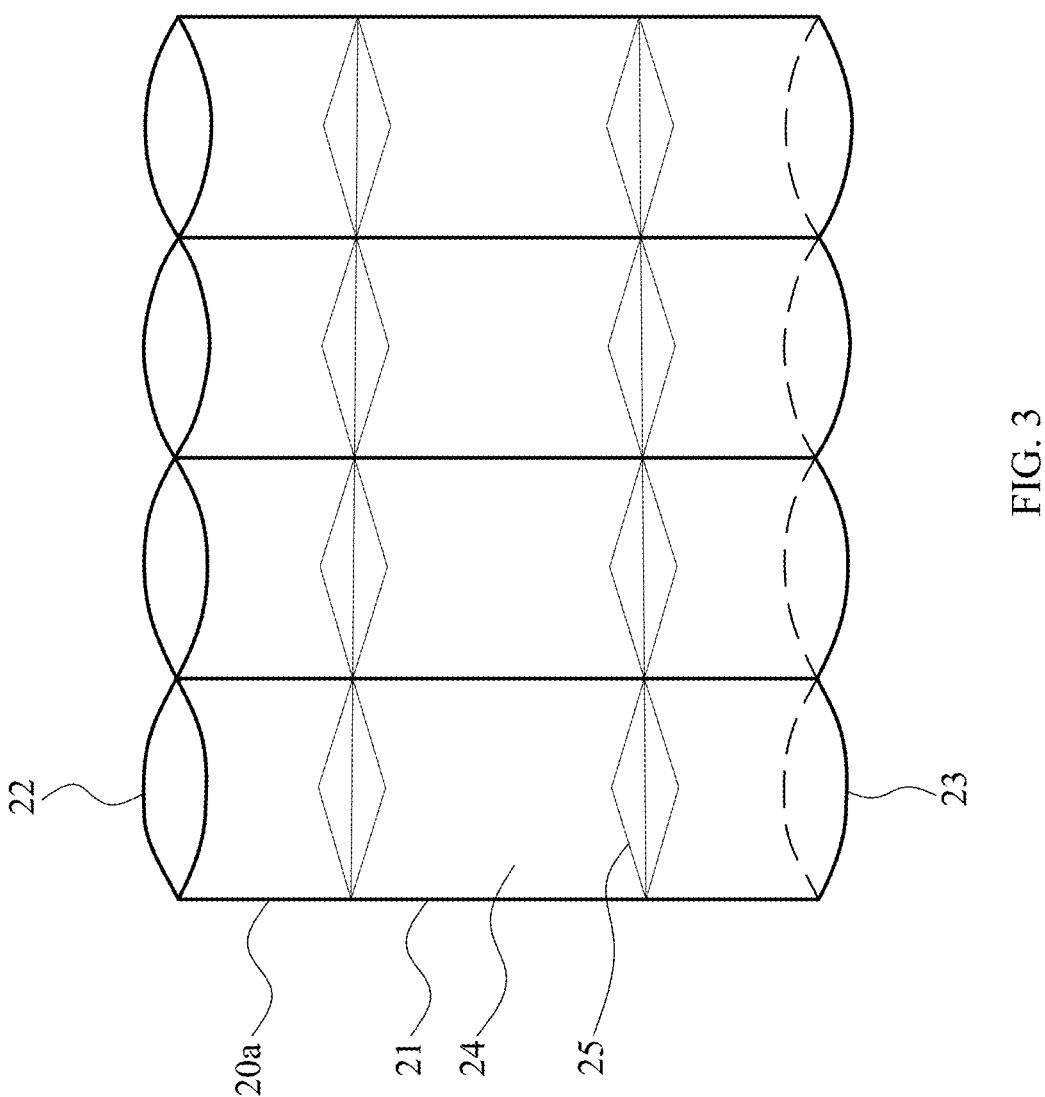
FIG. 3 is a perspective view of a tubular pocket fabric according to one embodiment of the present invention.
Figure 3:
Figure 4:
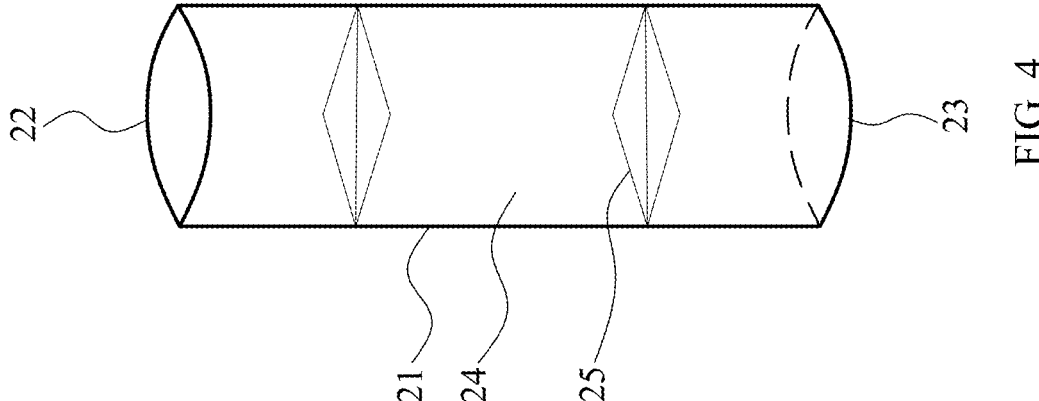
FIG. 4 is a perspective view of a tubular pocket in the tubular pocket fabric in FIG. 3 according to the present invention.
Figure 4:

Referring to FIG. 3 and FIG. 4, in the present invention, a pocket fabric 10*a* includes at least one tubular pocket 20*a*. Each tubular pocket 20*a* includes:

a tubular sidewall 21 formed between two ends 22 and 23 of the tubular pocket 20*a*, where the ends 22 and 23 are in a closed state to keep filler inside the tubular pocket 20*a*;

at least two filling chambers 24 formed between the two ends 22 and 23 and surrounded by the tubular sidewall 21, where the filling chambers 24 are used to accommodate filler; and at least one mesh barrier layer 25 provided between two filling chambers 24 and substantially perpendicular to the tubular sidewall 21, wherein the filling chambers 24 are communicated with each other and the filler can also be present in the mesh barrier layer 25, but the filler in a filling chamber 24 cannot move substantially to adjacent filling chambers 24, so the filler will not accumulate in one place due to gravity or other external forces. Therefore, the pocket fabric of the present invention can maintain the desired warmth retention property after a period of use, for the comfort of the wearer.

The term "substantially perpendicular" indicates that an angle between the mesh barrier layer 25 and the tubular sidewall 21 may range from about 60° to about 120°; in some embodiments, the angle may range from about 75° to about 105°; in another embodiments, the angle may range from about 85° to about 95°, as long as the filler would not be accumulated in one specific position.

In the present invention, the distance between an end 22 or 23 and a mesh barrier layer 25 near the end 22 or 23 is about 2 cm to about 20 cm, preferably about 5 cm to about 15 cm, more preferably about 8 cm to about 12 cm.

In the present invention, when a tubular pocket 20*a* of the pocket fabric 10*a* includes a plurality of mesh barrier layers 25, the distance between two mesh barrier layers 25 is about 2 cm to about 20 cm, preferably about 5 cm to about 15 cm, more preferably about 8 cm to about 12 cm.

Figure 8:
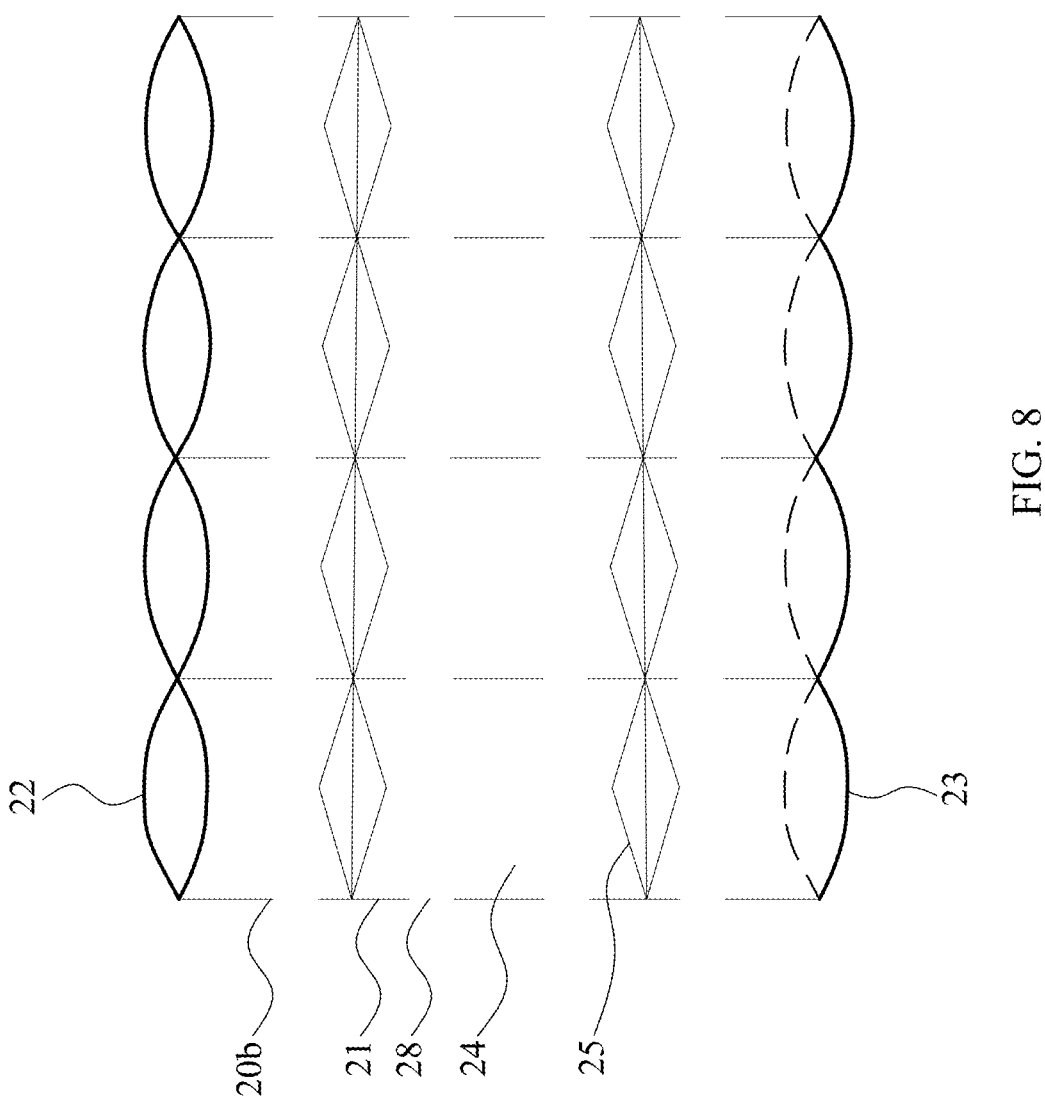
FIG. 8 is a perspective view of a tubular pocket fabric according to some embodiments of the present invention.

In the present invention, each tubular pocket 20*a* of the pocket fabric 10*a* may be composed of a first pocket wall and a second pocket wall. The first pocket wall is interwoven with first warp yarns and first weft yarns. The second pocket wall is interwoven with second warp yarns and second weft yarns. The first pocket walls are arranged on one side of the pocket fabric 10*a*, and the second pocket walls are arranged on the other side of the pocket fabric 10*a*; or the first pocket walls and the second pocket walls are alternately arranged on each side of the pocket fabric 10*a*, with the first pocket walls on one side of the pocket fabric 10*a* being correspondingly opposite to the second pocket walls on the other side. A plurality of tubular pockets 20*a* may be completely continuous (as shown in FIG. 3 and FIG. 8), partially continuous and partially spaced, or completely discontinuous. The density of warp yarns and weft yarns may independently range from about 100 yarns to about 1400 yarns per inch, preferably about 200 yarns to about 1200 yarns per inch, more preferably about 300 yarns to about 1000 yarns per inch. The warp yarns and weft yarns may be made of artificial fibers (hydrophilic fibers and hydrophobic fibers such as polyamide fibers, polyester fibers, elastic fibers, or polypropylene fibers), regenerated fibers (such as rayon), or natural fibers (such as cotton or wool) as raw materials.

In the present invention, the thickness of the tubular pocket 20*a* may be about 0.01 mm to about 5 mm, preferably about 0.05 mm to about 1 mm, more preferably about 0.05 mm to about 0.8 mm, most preferably about 0.08 mm to about 0.5 mm. The tubular pocket 20*a* may have a denier number between about 5 and about 1200, preferably between about 15 and about 1000, more preferably between about 30 and about 1000, still more preferably between about 75 and about 600. The tubular pocket 20*a* may independently have a count between about 5 and about 200, preferably between about 10 and about 180, more preferably between about 16 and about 150, still more preferably between about 30 and about 120.

In the present invention, there is no limitation to the type or weight of the filler. For example, garments suitable for autumn and winter have more down or artificial cotton filled inside than garments suitable for spring or summer, so the amount of filler may be determined according to the style design of the garment and the seasons for which the garment is designed. In addition, when the filler is artificial cotton, the density of yarn segments in the mesh barrier layer 25 may be adjusted according to the cotton particle size. For example, when the cotton particles are small, yarn segments in the mesh barrier layer 25 have to be denser; and when the cotton particles are large, yarn segments in the mesh barrier layer 25 may be sparser. Therefore, the type of filler and the design (especially the density) of the mesh barrier layer 25 may be adjusted as desired. In an implementation aspect of the present invention, the amount of filler is about 120 g/m² to about 200 g/m².

In the present invention, each mesh barrier layer 25 includes a plurality of yarn segments connected to a plurality of points on an inner side of the tubular sidewall 21. The yarn segments in each mesh barrier layer 25 may be arranged in the same plane; alternatively, the yarn segments in each mesh barrier layer 25 may be separated from each other. For example, each mesh barrier layer 25 may have a thickness of equal to or larger than the thickness of one yarn and less than about 1 cm. In some embodiment, each mesh barrier layer 25 may have a thickness of less than about 0.5 cm. In some embodiment, each mesh barrier layer 25 may have a thickness of less than about 0.2 cm.

Figures 5A, 5B:
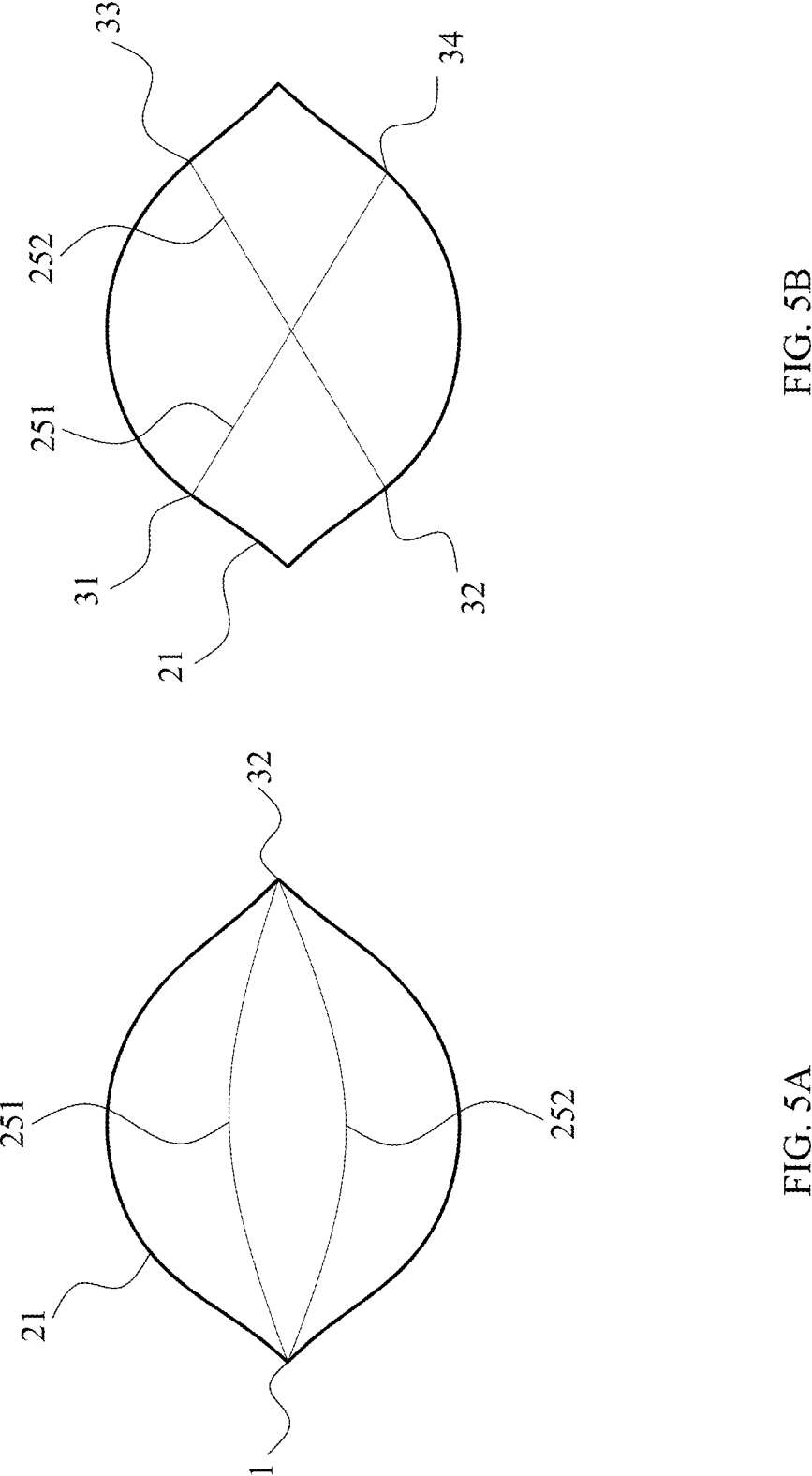
FIG. 5A to FIG. 5H are top views of a mesh barrier layer of a tubular pocket fabric according to some embodiments of the present invention.
Figure 6:
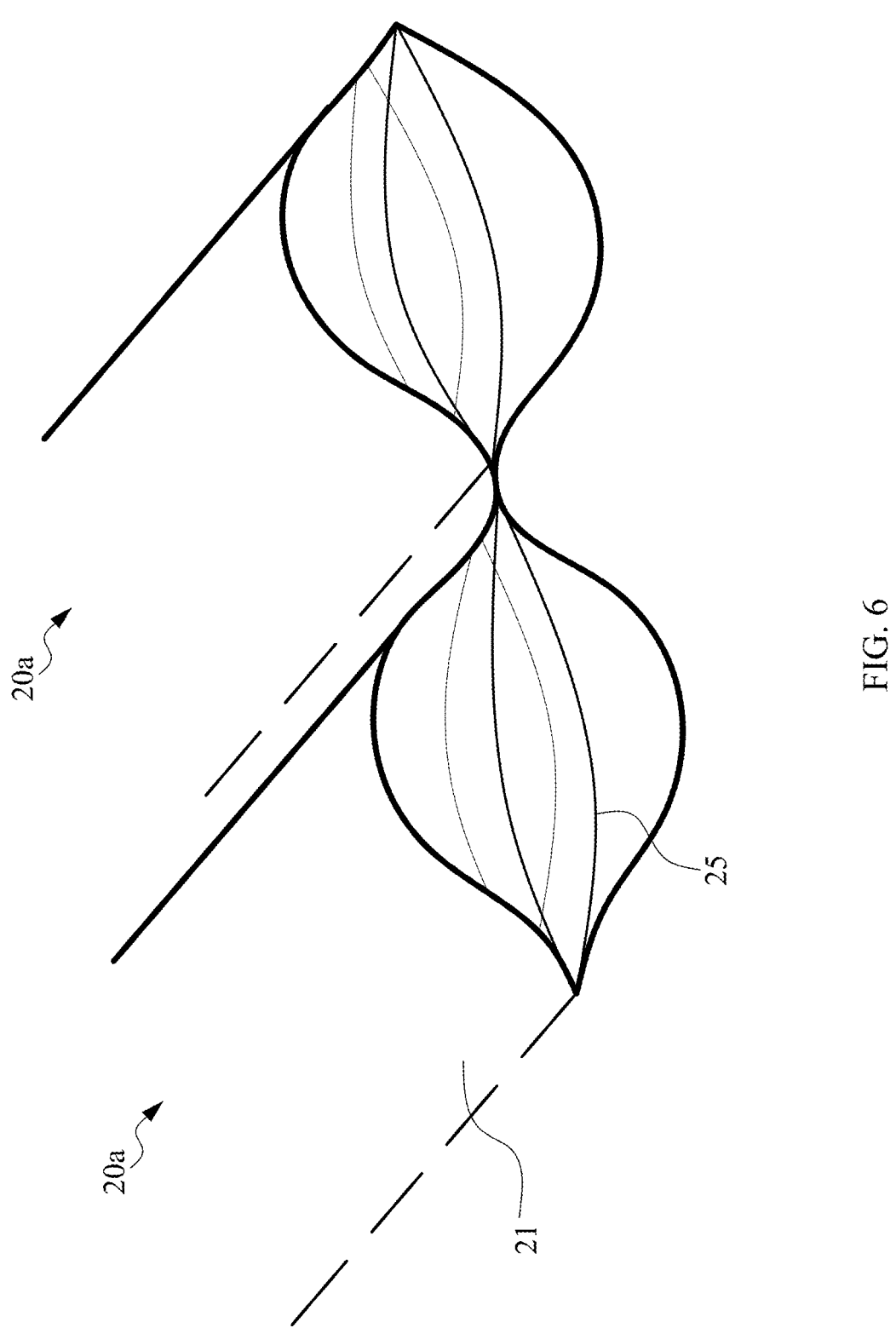
FIG. 6 and FIG. 7 are perspective views of a tubular pocket fabric according to some embodiments of the present invention.

Referring to FIG. 5A and FIG. 6, each mesh barrier layer 25 may include at least two yarn segments 251 and 252 connected to two points 31 and 32 on an inner side of the tubular sidewall 21. The two points 31 and 32 are opposite to each other on the tubular sidewall 21. Proximal ends of the yarn segments 251 and 252 are jointly connected to one point of the tubular sidewall 21, and distal ends of the yarn segments 251 and 252 are jointly connected to the point at the opposite position of the tubular sidewall 21.

Figures 5C, 5D:
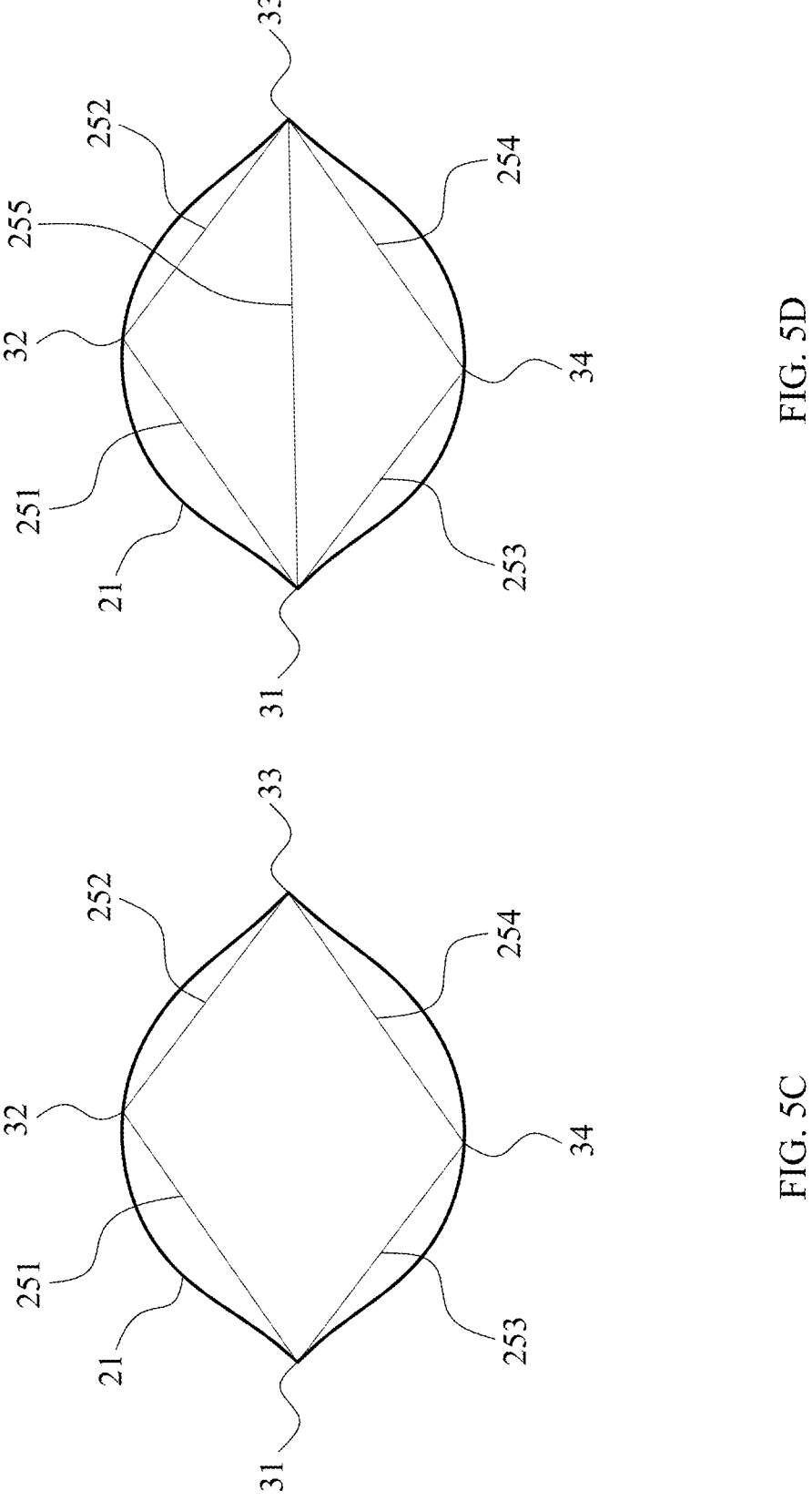

Referring to FIG. 5B to FIG. 5D, each mesh barrier layer 25 may include at least two yarn segments 251, 252, 253, and 254 connected to four points 31, 32, 33, and 34 on an inner side of the tubular sidewall 21. For example, each mesh barrier layer 25 may include an X-shaped structure formed by two yarn segments 251 and 252 cross-connected to four points 31, 32, 33, and 34 (as shown in FIG. 5B); or each mesh barrier layer 25 may include a quadrilateral structure formed by four yarn segments 251, 252, 253, and 254 (as shown in FIG. 5C); or each mesh barrier layer 25 may include a quadrilateral structure formed by four yarn segments 251, 252, 253, and 254, and one yarn segment 255 connected to two points 31 and 33 at opposite positions of the quadrilateral structure (as shown in FIG. 5D) or two yarn segments 255 and 256 connected to two points 31 and 32 and two points 33 and 34, respectively at opposite positions of the quadrilateral structure to form an X shape in the quadrilateral structure (as shown in FIG. 5E).

Figures 5E, 5F:
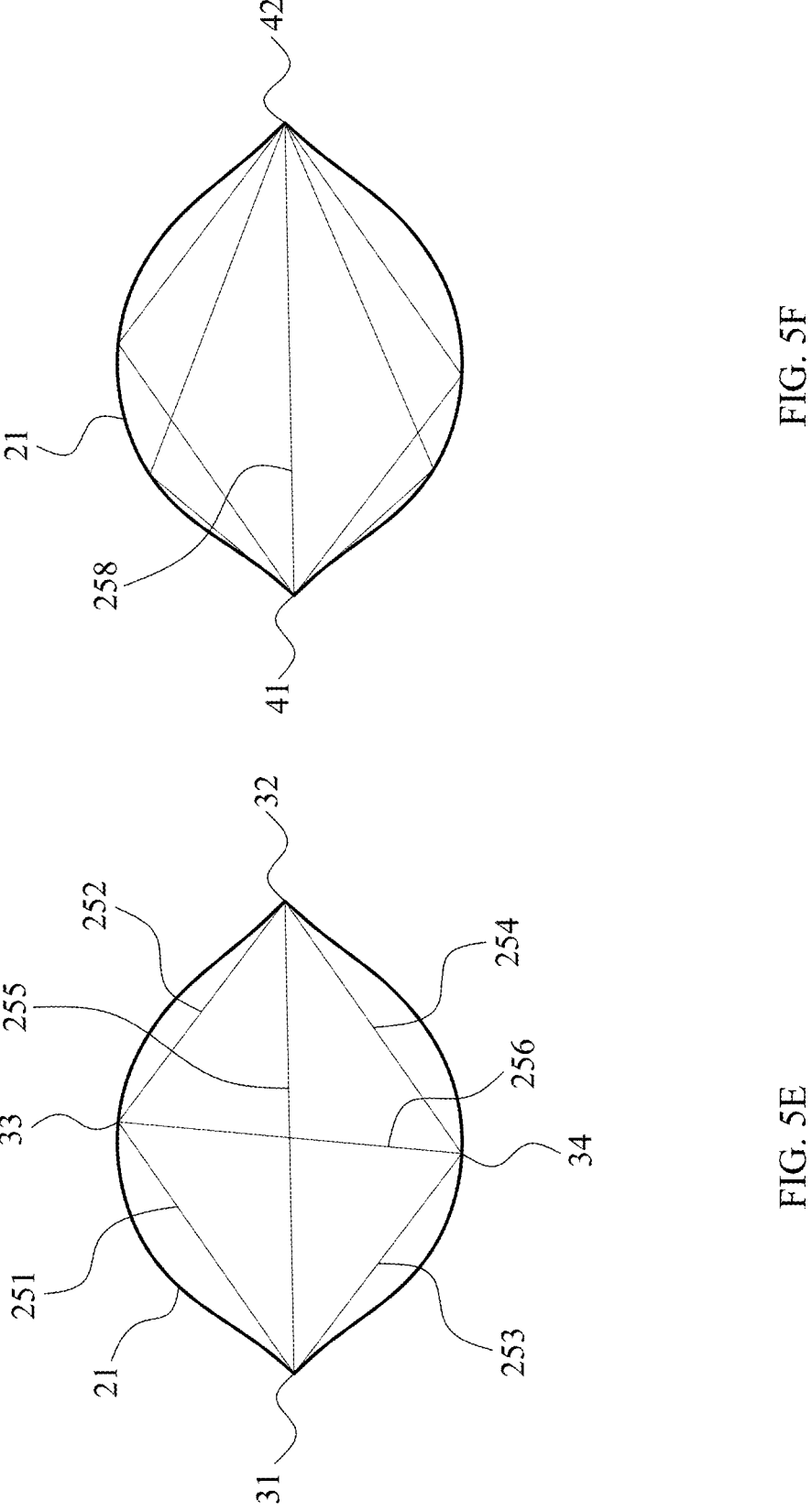
Figures 5G, 5H:
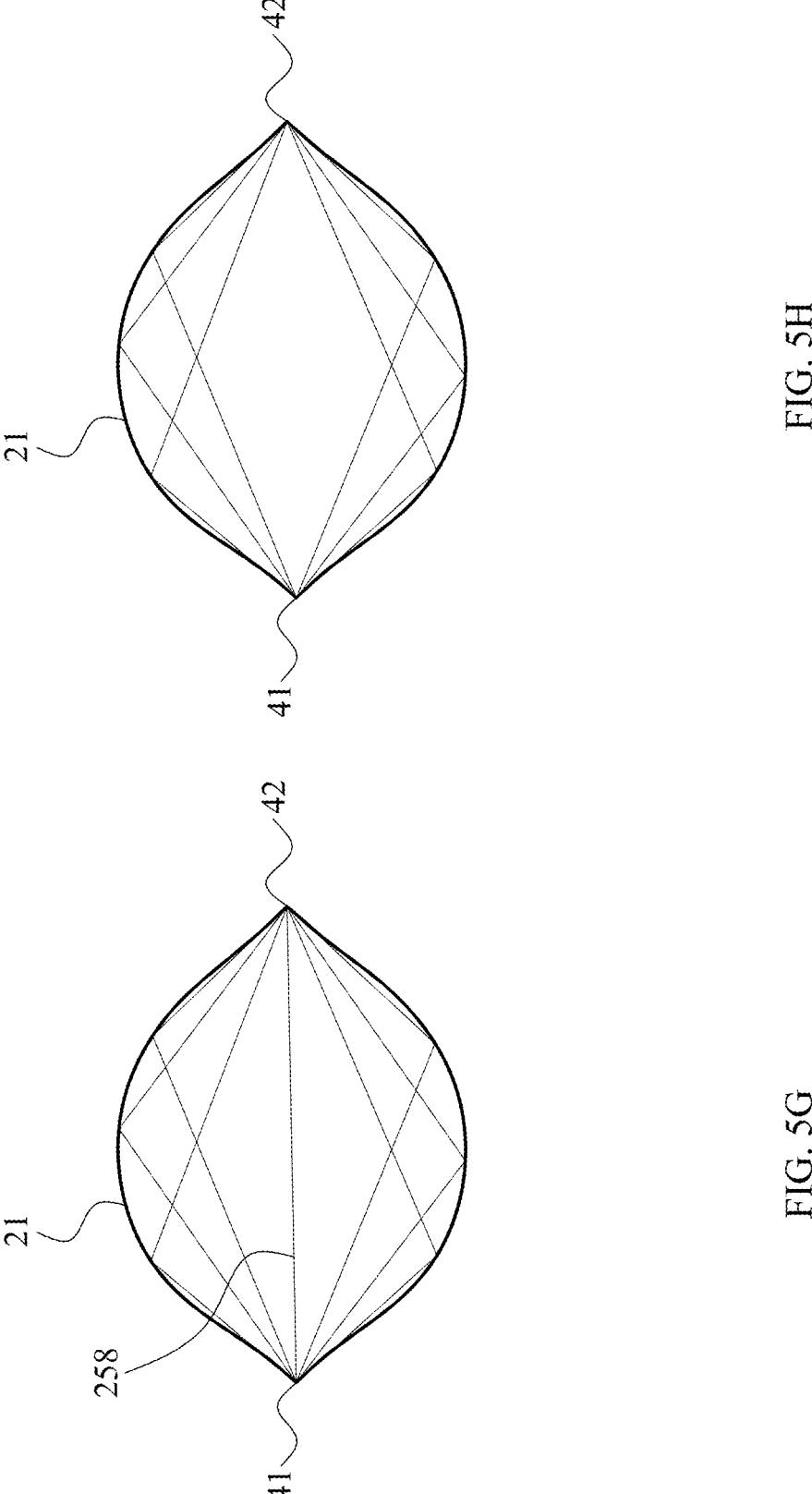
Figure 7:
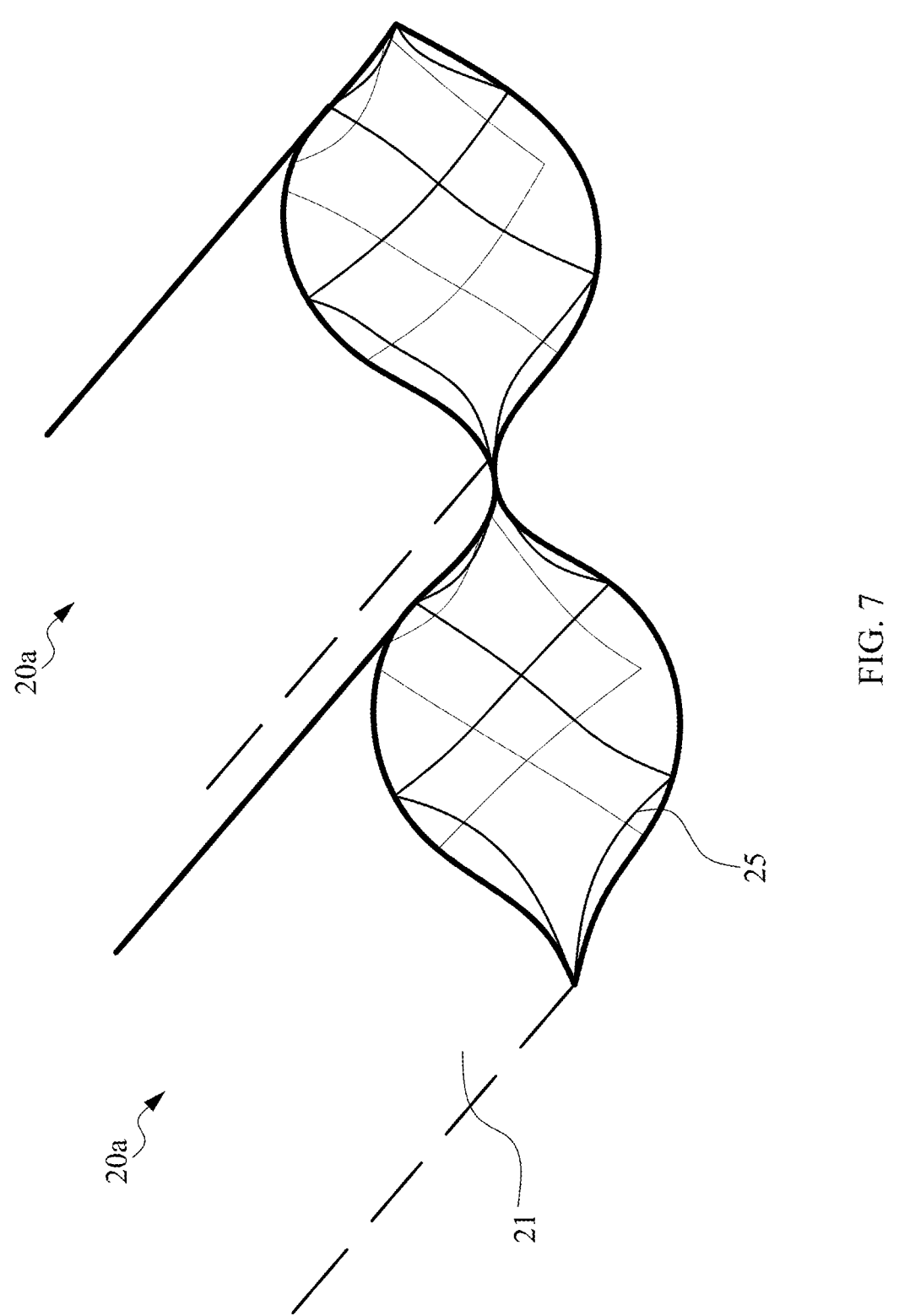
Figure 12:
FIG. 12 shows an image corresponding to FIG. 7.

Referring to FIG. 5F to FIG. 5H, FIG. 7, and FIG. 12, each mesh barrier layer 25 may include at least six yarn segments connected to at least six points on an inner side of the tubular sidewall 21. Referring to FIG. 5F to FIG. 5H, at least one end of each yarn segment is connected to one of two points 41 and 42 opposite to each other provided on the tubular sidewall 21. For example, the tubular sidewall 21 may have a central yarn segment 258 connecting the two opposite points 41 and 42, and a plurality of yarn segments form a plurality of triangles while the central yarn segment 258 as one side of each triangle, such as four triangles (as shown in FIG. 5F), six triangles (as shown in FIG. 5G), or the pattern shown in FIG. 5G but without the central yarn segment (as shown in FIG. 5H). The structure of the mesh barrier layer 25 in the present invention is not limited to the above structure, but can comprise various mesh structures. As shown in FIG. 7 and FIG. 12, each mesh barrier layer 25 is in a figure-eight shape.

As shown in FIG. 3, in some embodiments, the pocket fabric 10a may include a plurality of tubular pockets 20a arranged in a direction perpendicular to a tubular sidewall 21 of the tubular pockets 20a, where the tubular pockets 20a are not communicated with each other.

As shown in FIG. 8, in some embodiments, the pocket fabric 10b may include a plurality of tubular pockets 20b arranged in a direction perpendicular to a tubular sidewall 21 of the tubular pockets 20b, where the tubular sidewall 21 of each tubular pocket 20b includes a plurality of vents 28 to be in communication with adjacent tubular pockets 20b. The adjacent tubular pockets 20b are communicated with each other through the vents 28, so that air will not be compressed in the same tubular pocket when worn but will flow from one tubular pocket 20b to an adjacent tubular pocket 20b; and the filler is less likely to be compressed and therefore less likely to leak from the tubular sidewall 21.

Figure 9:
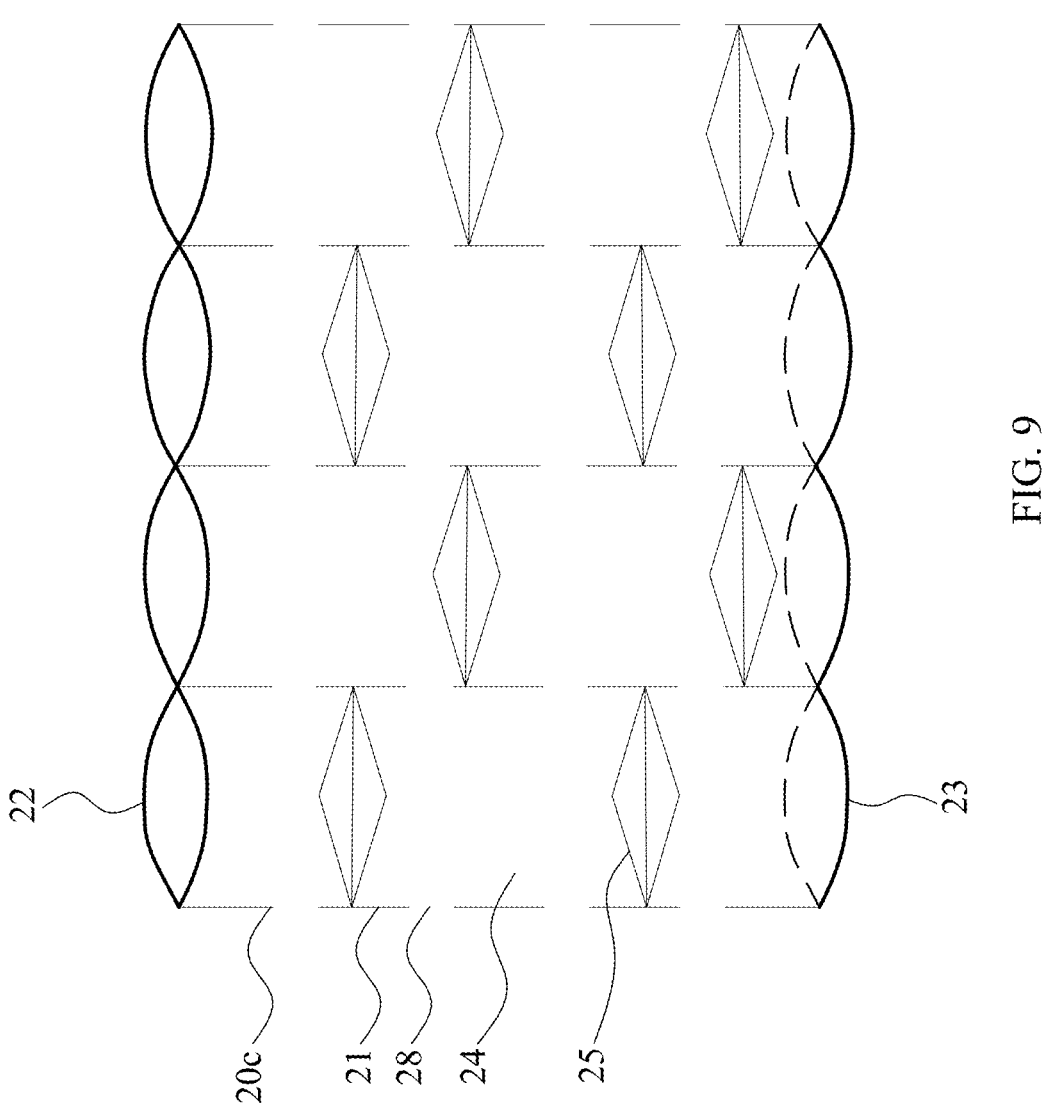
FIG. 9 is a perspective view of a tubular pocket fabric according to some embodiments of the present invention.

In some embodiments, as shown in FIG. 3 and FIG. 8, each tubular pocket 20a or 20b may include a plurality of mesh barrier layers 25 parallel to each other, and one layer of mesh barrier layer 25 of a tubular pocket 20a or 20b is on the same plane as the same layer of mesh barrier layer 25 of an adjacent tubular pocket 20a or 20b. In some embodiments, in a pocket fabric 10c shown in FIG. 9, a mesh barrier layer 25 in one layer of a tubular pocket 20c and the mesh barrier layer 25 in the same layer of an adjacent tubular pocket 20c may be in different planes, and be staggered from each other; but the disclosures are not limited thereto. For example, the mesh barrier layer 25 in each tubular pocket can be arranged randomly.

In the present invention, the pocket fabric may be made into clothing, sleeping bags, bedding, and the like. The tubular pockets may be filled with filler such as down, cotton cloth, and artificial resin cotton.

In the manufacture of the tubular pocket fabric of the present invention, mesh barrier layers can be integrally formed through drafting alone, or lifting alone, or a combination thereof.

EXAMPLES

Example 1

Figure 10:
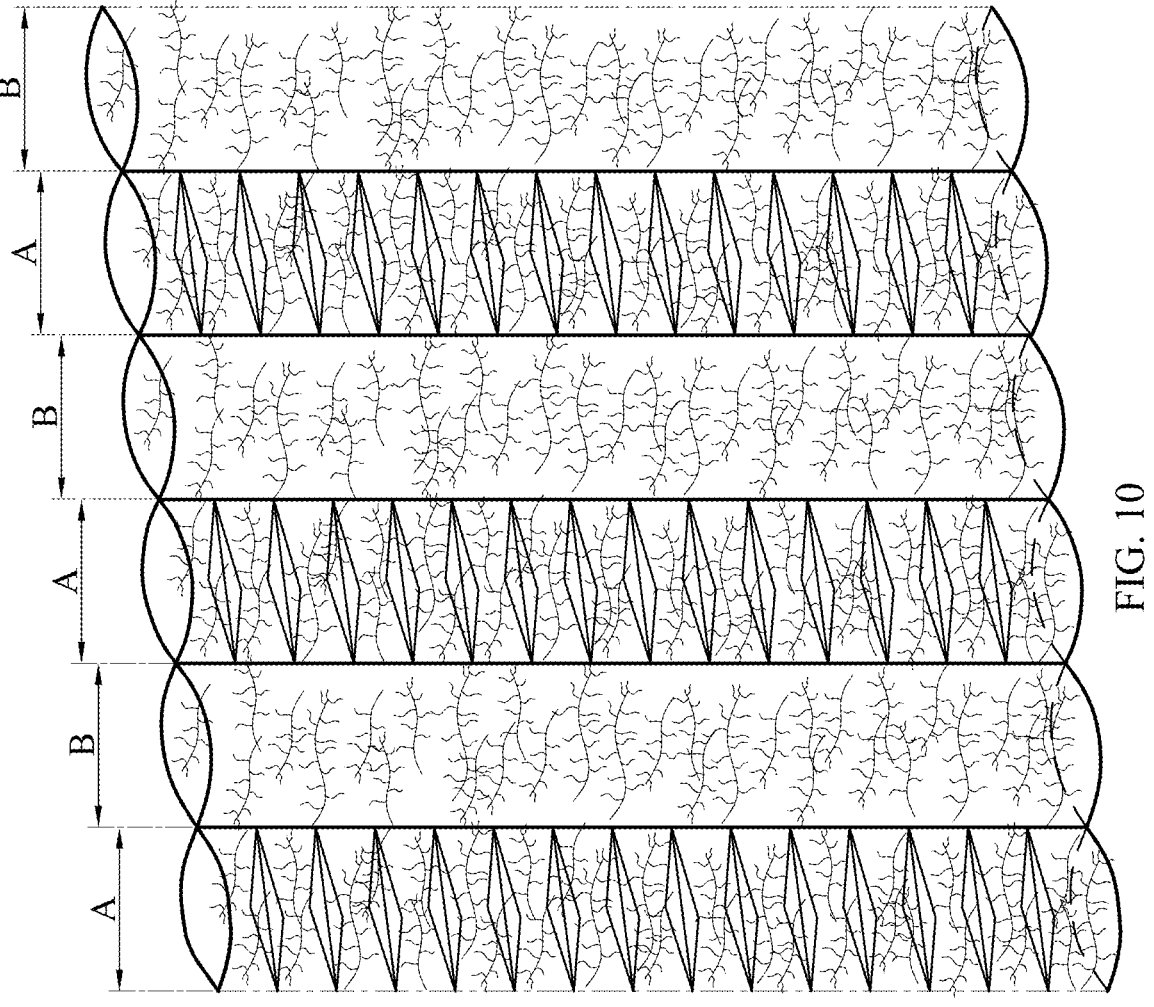
FIG. 10 is a schematic diagram of a tubular pocket fabric of the present invention (region A) and a conventional pocket fabric (region B) before treatment.
Figure 11:
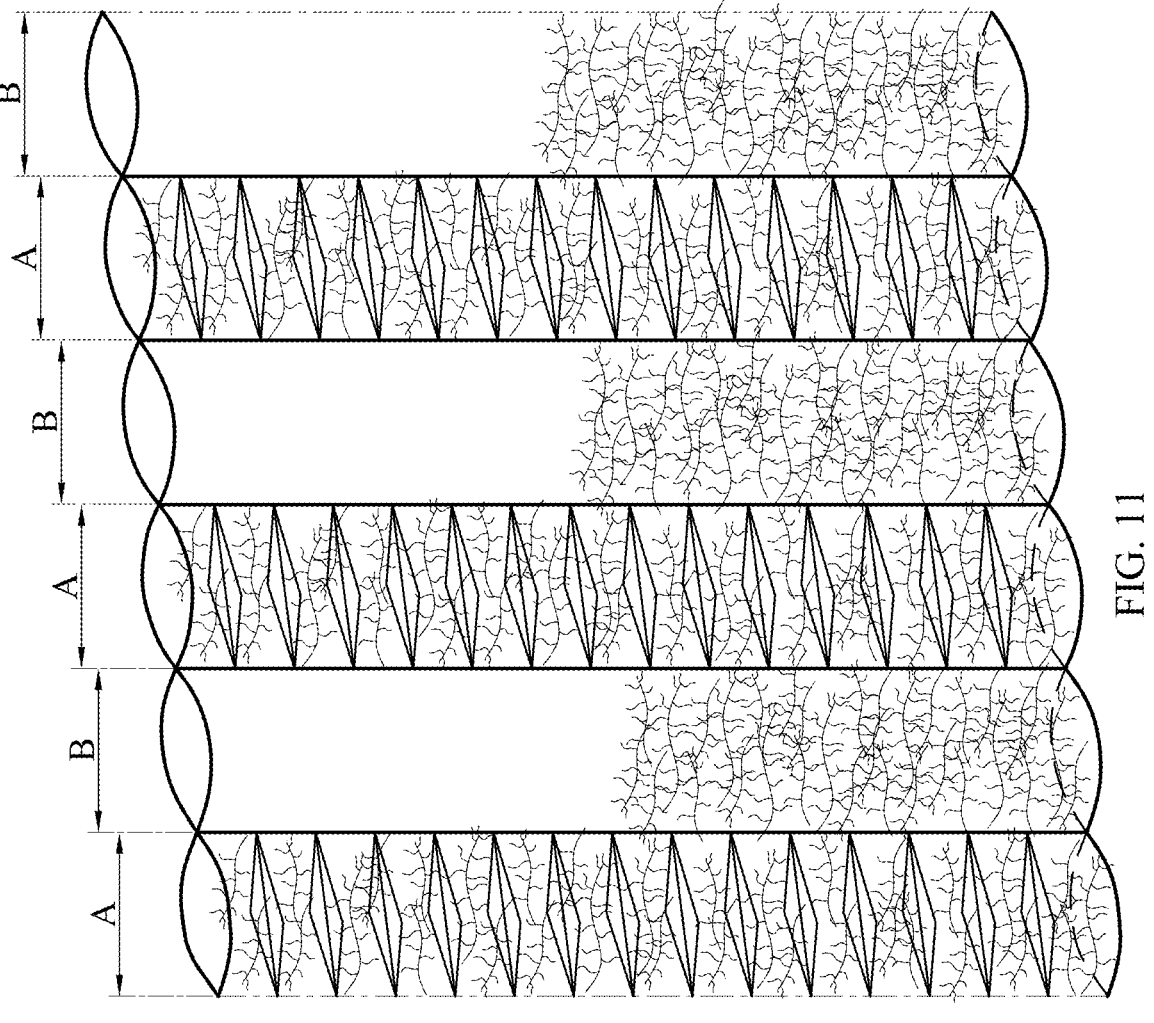
FIG. 11 is a schematic diagram of a tubular pocket fabric of the present invention (region A) and a conventional pocket fabric (region B) after treatment.
Figure 13:
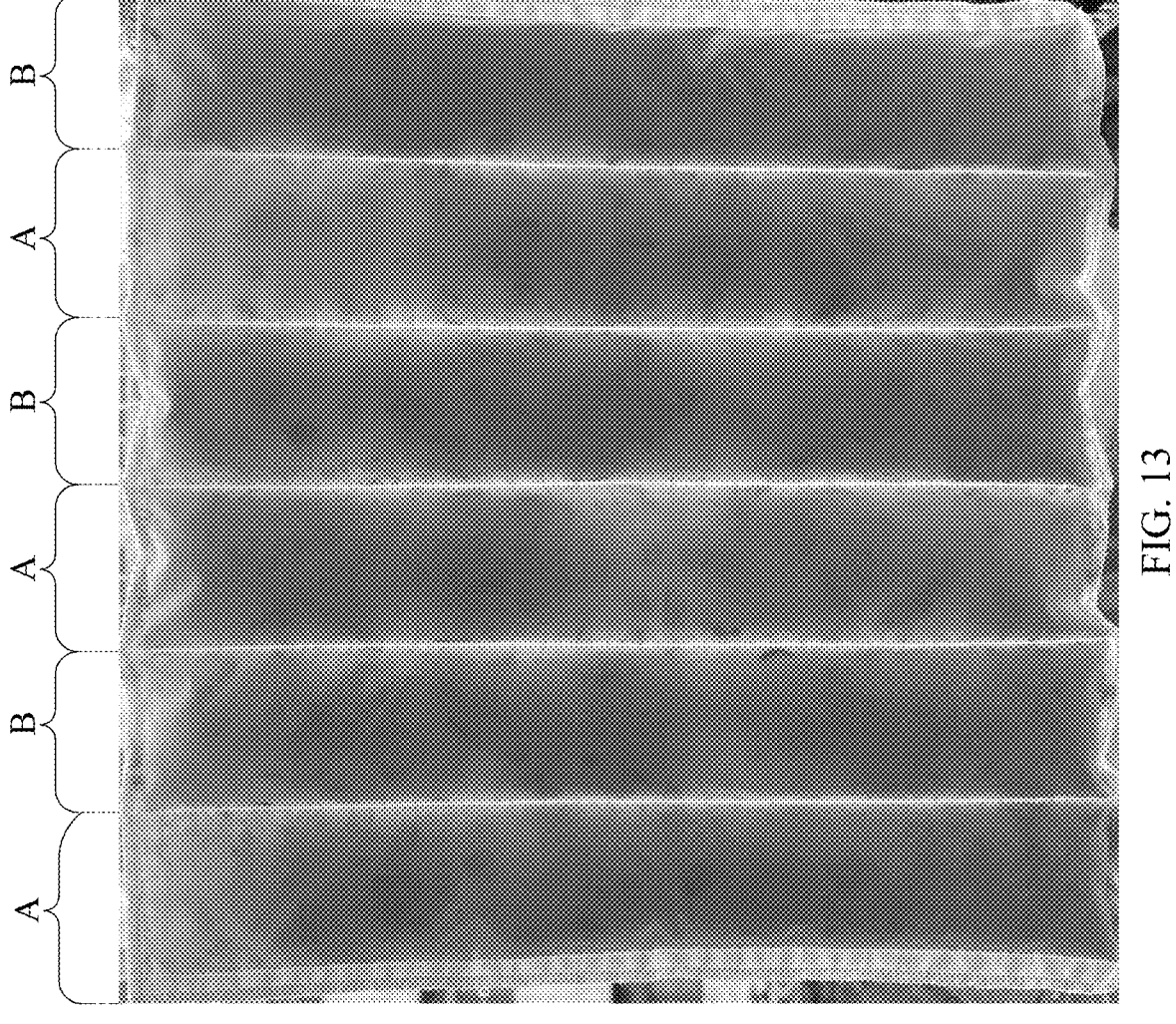
FIG. 13 shows an image corresponding to FIG. 10.
Figure 14:
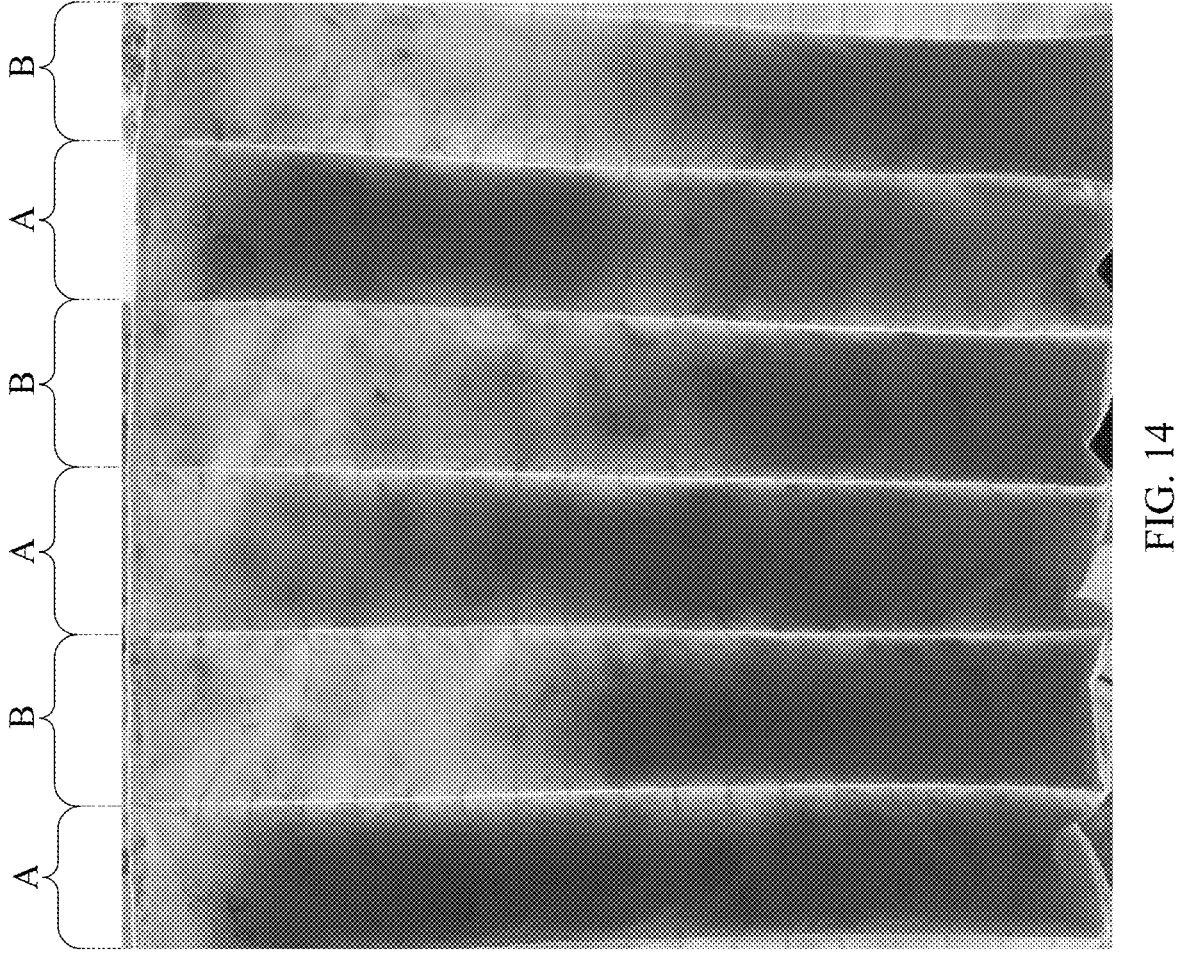
FIG. 14 shows an image corresponding to FIG. 11.

Referring to region A in FIG. 10 and FIG. 11 (also referring to images of FIG. 13 to FIG. 15), in Example 1 of the present invention, a pocket wall of each tubular pocket of a pocket fabric was interwoven with 50 denier of polyester filament and 75 denier of polyester filament, and mesh barrier layers were provided every 2 cm in each tubular pocket. While the grey cloth of the pocket fabric was woven by a loom, weft yarns were woven into the tubular pocket in a parallel- or cross-suspended manner to form the mesh barrier layer. In this example, the structure of each mesh barrier layer was in a figure-eight shape, as shown in FIG. 7 and FIG. 12. As shown in region A in FIG. 10 and FIG. 11, each tubular pocket had a length of about 31 cm and a width of about 6 cm, the mesh barrier layers were provided every 2 cm in a length direction, and each tubular pocket was filled with about 3 g of filler (about 150 to about 160 g/m2). In this example, the filler had an 80/20 down-feather ratio.

Comparative Example 1

Referring to region B in FIG. 10 and FIG. 11 (also referring to the images of FIG. 13 and FIG. 14), in the conventional pocket fabric of Comparative Example 1, a pocket wall of each tubular pocket was also interwoven with 50 denier of polyester filament and 75 denier of polyester filament, but no mesh barrier layers were provided in each tubular pocket. As described in Example 1 above, each tubular pocket in Comparative Example 1 had a length of about 31 cm and a width of about 6 cm, and each tubular pocket was filled with about 3 g of filler (about 150 to about 160 g/m2). The filler had an 80/20 down-feather ratio.

Tests and Results

To compare the tubular pocket fabric with mesh barrier layer of the present invention with the conventional tubular pocket fabric without any mesh barrier layer, Example 1 of the present invention and Comparative Example 1 were applied to the same fabric, as shown in FIG. 10 (also referring to the image in FIG. 13), in which the region A in FIG. 10 shows Example 1 of the present invention and the region B in FIG. 10 shows Comparative Example 1. After the same treatment (one machine wash with clean water), the result of the fabric is shown in FIG. 11 (also referring to the image in FIG. 14).

Figure 15:
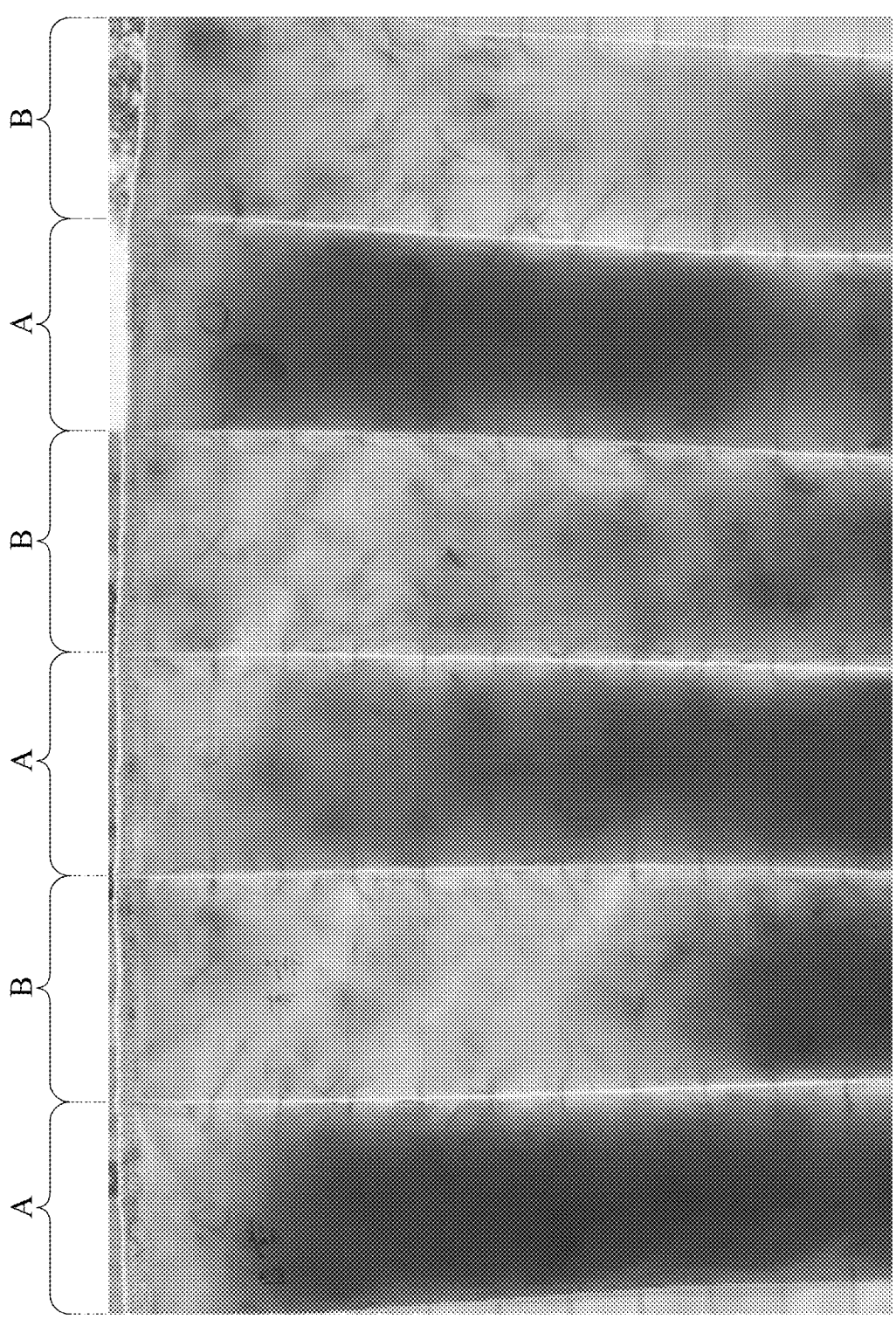
FIG. 15 shows an enlarged image of the upper half portion of FIG. 13.

It can be clearly seen from region A in FIG. 11 (also referring to the image in FIG. 14) that after the tubular pocket fabric provided with the mesh barrier layer in the present invention is treated, the filler inside are still evenly distributed in each tubular pocket, and there is no deposition of filler. It can be clearly found from the region B in FIG. 11 and FIG. 14 that the filler in each tubular pocket all deposit in one direction (downward). It can further be clearly seen from FIG. 15 that the filler remaining in the region B in FIG. 15 are very sparse. In contrast, the presence of mesh barrier layer in the tubular pocket fabric of the present invention shown in the region A in FIG. 15 can indeed avoid or reduce the movement of filler in the tubular pocket and even accumulation in a certain region after long-term use or multiple washings, so that the filler can remain evenly distributed, and the desired warmth retention property can be retained.

The technical features and advantages of the present invention have been quite extensively summarized above, so that the present invention can be better understood. A person of ordinary skill in the art of the present invention should understand that the concepts and specific examples disclosed above can be used fairly easily to modify or design other structures or processes to achieve the same purpose as the present invention. A person of ordinary skill in the art of the present invention should also understand that such equivalent structures and methods still fall within the spirit and scope of the present invention as defined by the appended claims.

What is claimed is:

1. A pocket fabric, comprising a plurality of tubular pockets, wherein each of the plurality of tubular pockets comprises:

a tubular sidewall formed between two ends of the tubular pocket;

at least two filling chambers formed between the two ends and surrounded by the tubular sidewall; and at least one mesh barrier layer provided between two filling chambers and substantially perpendicular to the tubular sidewall, wherein the two filling chambers are communicated with each other, wherein the plurality of tubular pockets are arranged in a direction perpendicular to the tubular sidewall of each tubular pocket, and wherein the tubular sidewall between two of the plurality of tubular pockets comprises a plurality of connecting portions and a plurality of vents arranged alternately so that each of the plurality of vents is located between two of the plurality of connecting portions and one of the plurality of tubular pockets is communicated with an adjacent one of the plurality of tubular pockets through the plurality of vents, and wherein the mesh barrier layer in one of the plurality of tubular pockets and the mesh barrier layer in an adjacent one of the plurality of tubular pockets are arranged in a staggered form.

2. The pocket fabric according to claim 1, wherein each mesh barrier layer comprises at least two yarn segments connected to two points on an inner side of the tubular sidewall.

3. The pocket fabric according to claim 2, wherein the two points are opposite to each other at the tubular sidewall, proximal ends of yarn segments are jointly connected to one point of the tubular sidewall, and distal ends of yarn segments are jointly connected to the point at the opposite position of the tubular sidewall.

4. The pocket fabric according to claim 1, wherein each mesh barrier layer comprises at least two yarn segments connected to four points on an inner side of the tubular sidewall.

5. The pocket fabric according to claim 4, wherein each mesh barrier layer comprises an X-shaped structure formed by two yarn segments cross-connected to four points.

6. The pocket fabric according to claim 4, wherein each mesh barrier layer comprises a quadrilateral structure formed by four yarn segments.

7. The pocket fabric according to claim 4, wherein each mesh barrier layer comprises a quadrilateral structure formed by four yarn segments, and at least one yarn segment connects two points at opposite positions of the quadrilateral structure.

8. The pocket fabric according to claim 1, wherein each mesh barrier layer comprises at least six yarn segments connected to at least six points on an inner side of the tubular sidewall, and at least one end of each yarn segment is connected to one of two points opposite to each other provided on the tubular sidewall.

9. The pocket fabric according to claim 1, wherein each mesh barrier layer is in a figure-eight shape.

10. The pocket fabric according to claim 1, wherein one layer of mesh barrier layer of a tubular pocket is on the same plane as the same layer of mesh barrier layer of an adjacent tubular pocket.

11. The pocket fabric according to claim 1, wherein the distance between one end and the mesh barrier layer near the end is about 2 cm to about 20 cm.

12. The pocket fabric according to claim 1, wherein when a tubular pocket of the pocket fabric comprises a plurality of mesh barrier layers, the distance between two adjacent mesh barrier layers is about 2 cm to about 20 cm.

13. A pocket fabric, comprising a plurality of tubular pockets, wherein each of the plurality of tubular pockets comprises:

a tubular sidewall formed between two ends of the tubular pocket;

at least two filling chambers formed between the two ends and surrounded by the tubular sidewall;

at least one mesh barrier layer provided between two filling chambers and substantially perpendicular to the tubular sidewall, wherein the two filling chambers are communicated with each other, and wherein each mesh barrier layer comprises at least two yarn segments connected to two points on an inner side of the tubular sidewall; and filler filled in the filling chambers and being present in the mesh barrier layer, wherein the plurality of tubular pockets are arranged in a direction perpendicular to the tubular sidewall of each tubular pocket, and wherein the tubular sidewall between two of the plurality of tubular pockets comprises a plurality of connecting portions and a plurality of vents arranged alternately so that each of the plurality of vents is located between two of the plurality of connecting portions and one of the plurality of tubular pockets is communicated with an adjacent one of the plurality of tubular pockets through the plurality of vents, and wherein the mesh barrier layer in one of the plurality of tubular pockets and the mesh barrier layer in an adjacent one of the plurality of tubular pockets are arranged in a staggered form.

14. The pocket fabric according to claim 13, wherein the amount of filler is about 120 $g/m^2$ to about 200 $g/m^2$.

15. The pocket fabric according to claim 13, wherein the filler have 80/20 down-feather ratio.

16. The pocket fabric according to claim 13, wherein one layer of mesh barrier layer of a tubular pocket is on the same plane as the same layer of mesh barrier layer of an adjacent tubular pocket.

17. The pocket fabric according to claim 13, wherein the distance between one end and the mesh barrier layer near the end is about 2 cm to about 20 cm.

18. The pocket fabric according to claim 13, wherein when a tubular pocket of the pocket fabric comprises a plurality of mesh barrier layers, the distance between two adjacent mesh barrier layers is about 2 cm to about 20 cm.

\* \* \* \* \*